United States Patent
Bandyopadhyay et al.

(10) Patent No.: US 11,475,199 B1
(45) Date of Patent: Oct. 18, 2022

(54) PARALLELIZING SIMULATION AND HARDWARE CO-SIMULATION OF CIRCUIT DESIGNS THROUGH PARTITIONING

(71) Applicant: Xilinx, Inc., San Jose, CA (US)

(72) Inventors: Saikat Bandyopadhyay, San Jose, CA (US); Feng Cai, Longmont, CO (US); Tapodyuti Mandal, Hyderabad (IN); Vinayak Thonda, Hyderabad (IN); Sree Rohith Pulipaka, Hyderabad (IN)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 17/486,547

(22) Filed: Sep. 27, 2021

(51) Int. Cl.
  *G06F 30/30* (2020.01)
  *G06F 30/392* (2020.01)
  *G06F 30/3308* (2020.01)
  *G06F 117/08* (2020.01)

(52) U.S. Cl.
  CPC ........ *G06F 30/392* (2020.01); *G06F 30/3308* (2020.01); *G06F 2117/08* (2020.01)

(58) Field of Classification Search
  None
  See application file for complete search history.

(56) References Cited

U.S. PATENT DOCUMENTS

| | | | |
|---|---|---|---|
| 7,197,445 B1 | 3/2007 | Deepak et al. |
| 7,302,377 B1 | 11/2007 | Deepak |
| 7,330,808 B1 | 2/2008 | Jorgensen et al. |
| 7,451,417 B1 | 11/2008 | Campbell et al. |
| 7,590,137 B1 | 9/2009 | Chan et al. |
| 7,636,653 B1 | 12/2009 | Chan et al. |
| 7,673,201 B1 | 3/2010 | Chan et al. |
| 7,707,019 B1 | 4/2010 | Ballagh et al. |
| 7,721,090 B1 | 5/2010 | Deepak et al. |
| 7,739,092 B1 | 6/2010 | Ballagh et al. |
| 7,895,026 B1 | 2/2011 | Kelly et al. |
| 7,930,162 B1 | 4/2011 | Chan et al. |
| 8,041,553 B1 | 10/2011 | Hernandez et al. |
| 8,074,077 B1 | 12/2011 | Neema et al. |
| 8,150,638 B1 | 4/2012 | Wu et al. |
| 8,195,441 B1 | 6/2012 | Ou et al. |
| 8,352,229 B1 | 1/2013 | Ma et al. |
| 9,117,043 B1 | 8/2015 | Huang et al. |
| 10,296,673 B1 | 5/2019 | Ghosh et al. |
| 10,437,946 B1 | 10/2019 | Kasat et al. |
| 10,437,949 B1 | 10/2019 | Mihalache et al. |
| 10,671,785 B1 | 6/2020 | Mihalache et al. |

*Primary Examiner* — Leigh M Garbowski
(74) *Attorney, Agent, or Firm* — Kevin T. Cuenot

(57) ABSTRACT

Simulating a circuit design using a data processing system includes partitioning the circuit design into a top-level design and a sub-design along a boundary defined by one or more stream channels coupling a component of the top-level design with the sub-design. The sub-design is extracted from the circuit design and replaced with a stub having a client socket. A wrapper having a server socket is added to the sub-design. The top-level design and the sub-design are compiled into respective simulation kernels. The circuit design is simulated by executing the respective simulation kernels concurrently. The respective kernels communicate over a socket connection established by the client socket and the server socket. In other aspects, the partitioning results in partitions such that one partition is simulated as software and another partition is implemented in circuitry such that the circuit design may be hardware co-simulated.

20 Claims, 10 Drawing Sheets

PARALLELIZING SIMULATION AND HARDWARE CO-SIMULATION OF CIRCUIT DESIGNS THROUGH PARTITIONING

TECHNICAL FIELD

This disclosure relates to integrated circuits (ICs) and, more particularly, to parallelizing simulation and hardware co-simulation of circuit designs through partitioning.

BACKGROUND

Computer-based simulation is a valuable tool for verifying the functionality of circuit designs and ensuring that circuit designs are likely to meet established design requirements. Computer-based simulation allows such verification without having to implement the circuit design within an integrated circuit (IC). Though useful, computer-based simulations do execute significantly more slowly than actual implementations of circuit designs in ICs. As ICs become larger and more sophisticated, so too do the circuit designs intended for implementation in such ICs. The increased size and complexity of circuit designs often translates into longer compile times and slower runtimes for computer-based simulation.

SUMMARY

In one or more example implementations, a method includes partitioning a circuit design into a top-level design and a sub-design along a boundary defined by one or more stream channels coupling a component of the top-level design with the sub-design. The method includes extracting the sub-design from the circuit design and replacing the sub-design with a stub. The stub includes a client socket. The method includes adding a wrapper to the sub-design. The wrapper includes a server socket. The method includes compiling the top-level design and the sub-design into a top-level simulation kernel and a sub-design simulation kernel, respectively. The method also includes simulating the circuit design by executing the top-level simulation kernel and the sub-design simulation kernel concurrently. The top-level simulation kernel and the sub-design simulation kernel communicate over a socket connection established by the client socket and the server socket.

In one or more example implementations, a system includes a processor configured to initiate operations. The operations include partitioning a circuit design into a top-level design and a sub-design along a boundary defined by one or more stream channels coupling a component of the top-level design with the sub-design. The operations include extracting the sub-design from the circuit design and replacing the sub-design with a stub. The stub includes a client socket. The operations include adding a wrapper to the sub-design. The wrapper includes a server socket. The operations include compiling the top-level design and the sub-design into a top-level simulation kernel and a sub-design simulation kernel, respectively. The operations also include simulating the circuit design by executing the top-level simulation kernel and the sub-design simulation kernel concurrently. The top-level simulation kernel and the sub-design simulation kernel communicate over a socket connection established by the client socket and the server socket.

In one or more example implementations, a method includes partitioning a circuit design into a plurality of partitions including a first partition and a second partition. The plurality of partitions communicate through one or more stream channels. The method includes compiling the first partition into a simulation kernel executable by a data processing system. The method includes compiling the second partition into second partition circuitry for implementation in an integrated circuit (IC) coupled to the data processing system. The method also includes performing hardware co-simulation of the circuit design by executing the simulation kernel using the data processing system in coordination with running the second partition circuitry in the integrated circuit. The simulation kernel communicates with the second partition circuitry implemented in the IC over a communication link between the data processing system and the IC.

In one or more example implementations, a system includes a processor configured to initiate operations. The operations include partitioning a circuit design into a plurality of partitions including a first partition and a second partition. The plurality of partitions communicate through one or more stream channels. The operations include compiling the first partition into a simulation kernel executable by a data processing system. The operations include compiling the second partition into second partition circuitry for implementation in an IC coupled to the data processing system. The operations also include performing hardware co-simulation of the circuit design by executing the simulation kernel using the data processing system in coordination with running the second partition circuitry in the integrated circuit. The simulation kernel communicates with the second partition circuitry implemented in the IC over a communication link between the data processing system and the IC.

In one or more example implementations, a computer program product includes one or more computer readable storage media, and program instructions collectively stored on the one or more computer readable storage media. The program instructions are executable by computer hardware to initiate the various operations described within this disclosure.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
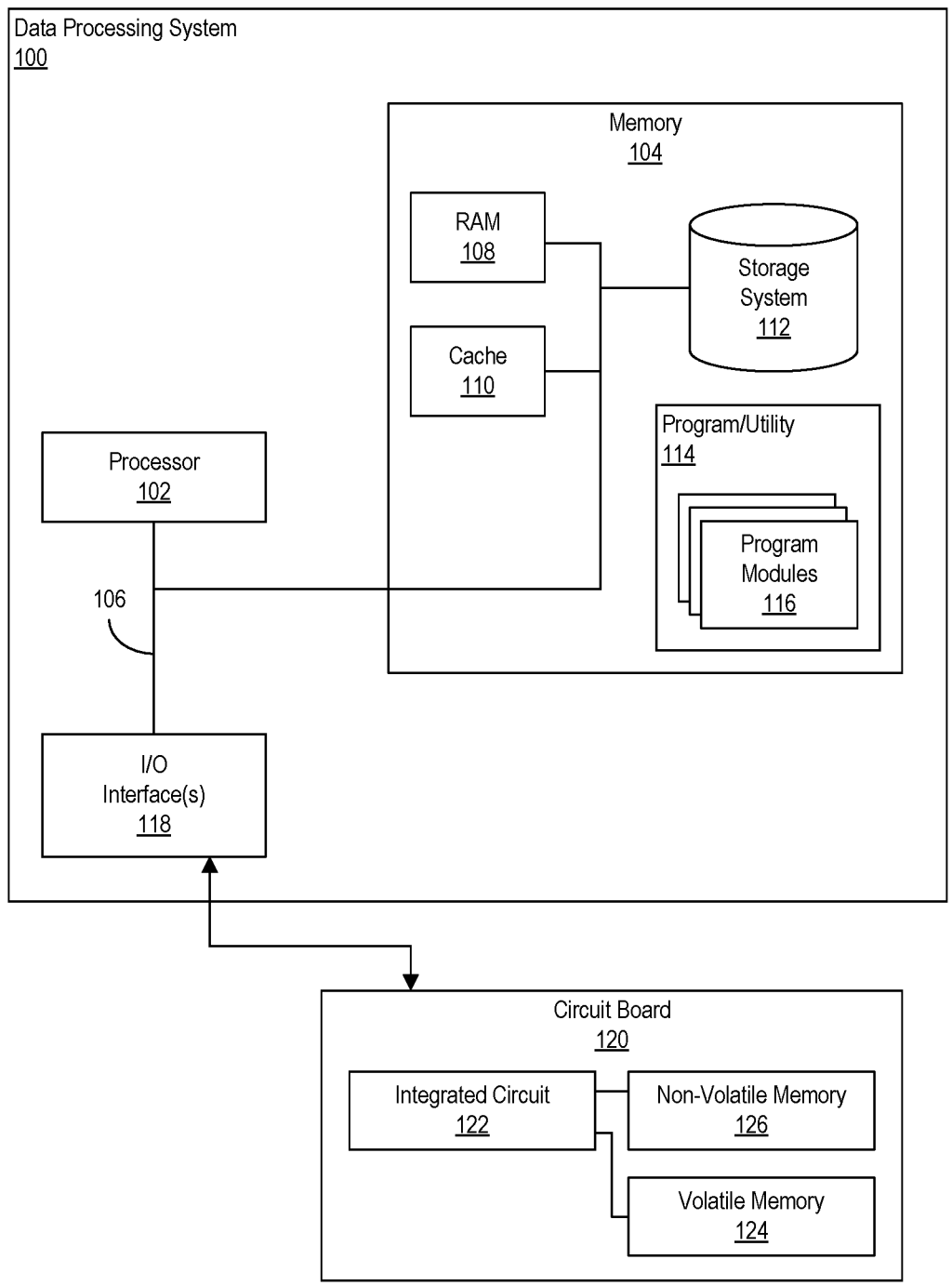
FIG. 1 illustrates an example computing environment that may be used for simulation and/or hardware co-simulation of circuit designs.

This disclosure relates to integrated circuits (ICs) and, more particularly, to parallelizing simulation and hardware co-simulation of circuit designs through partitioning. In accordance with the inventive arrangements described within this disclosure, a circuit design may be partitioned, e.g., divided, into two or more portions. The partitioning may be performed in accordance with boundaries between different portions of the circuit design defined by one or more stream channels. Stream channels implement a handshaking mechanism in which circuit blocks are coupled and communicate over the stream channels. Over the stream channels, for example, the circuit blocks are able to signal the availability of data and the ability to receive the available data. For example, a first circuit block, e.g., a master circuit block, signals to a second circuit block over the stream channel that the first circuit block has valid data that is ready to be sent. The second circuit block, e.g., a slave circuit block, signals to the first circuit block over the stream channel that the second circuit block is ready to receive the data.

With the circuit design divided into two or more portions along selected stream channel boundaries, the portions may be simulated using computer-based simulation or using hardware co-simulation. In the case of computer-based simulation, each different portion of the circuit design may be compiled into a different and independent simulation kernel. In one aspect, each simulation kernel may execute in a different process of a data processing system. As part of the compilation, an Electronic Design Automation (EDA) system is capable of including, or adding, to the various portions of the circuit design one or more hardware description language (HDL) and/or high-level programming language (HLPL) components that allow the different simulation kernels to communicate over sockets via inter-process communications.

In the case of hardware co-simulation, one or more of the portions of the circuit design may be simulated using a data processing system, while one or more other portions of the circuit design are implemented as circuitry within an IC and run as hardware in coordination with the portions of the circuit design simulated using the data processing system. An EDA system is capable of including, or adding, to the various portions of the circuit design one or more components that may be executed in the data processing system and one or more components that are implemented as circuitry in the IC, where the included or added components facilitate communication between the simulated portions of the circuit design and the hardware co-simulated portions in the IC.

Whether the circuit design is simulated using a computer or hardware co-simulated, performing the partitioning based on selected stream channel boundaries between different portions of the circuit design takes advantage of the handshaking interface. The partitioning decouples the different portions of the circuit design from one another such that cycle accurate simulation need not be performed. In general, each resulting portion of the circuit design may operate or run for a longer period of time before having to communicate or synchronize with the other portion(s) of the circuit design than would be the case without the stream channel-based partitioning described herein. The stream channel-based partitioning, in combination with executing different simulation kernels in different processes, allows the computer-based simulation to execute faster than would otherwise be the case. As such, hardware co-simulation also benefits from the faster computer-based simulation since the hardware co-simulation performance may be degraded from having to wait for the computer-based simulation to "catch up" to the hardware co-simulation. Further aspects of the inventive arrangements are described below with reference to the figures.

FIG. 1 illustrates an example computing environment that may be used for simulation and/or hardware co-simulation of circuit designs. The computing environment of FIG. 1 includes a data processing system 100 and a circuit board 120. The computing environment of FIG. 1 may be used with one or more of the example implementations described herein. For example, data processing system 100 is capable of performing the various operations described herein relating to processing a circuit design for simulation and/or hardware co-simulation. Data processing system 100 further is capable of executing a simulation of a circuit design. Data processing system 100 is capable of operating cooperatively with circuit board 120 to perform hardware co-simulation. It should be appreciated that in cases where computer-based simulation is performed without performing hardware co-simulation, circuit board 120 may be omitted from the computing environment.

The components of data processing system 100 can include, but are not limited to, a processor 102, a memory 104, and a bus 106 that couples various system components including memory 104 to processor 102. Processor 102 may be implemented as one or more processors. In an example, processor 102 is implemented as a central processing unit (CPU). Example processor types include, but are not limited to, processors having an x86 type of architecture (IA-32, IA-64, etc.), Power Architecture, ARM processors, and the like.

Bus 106 represents one or more of any of a variety of communication bus structures. By way of example, and not limitation, bus 106 may be implemented as a Peripheral Component Interconnect Express (PCIe) bus. Data processing system 100 typically includes a variety of computer system readable media. Such media may include computer-readable volatile and non-volatile media and computer-readable removable and non-removable media.

Memory 104 can include computer-readable media in the form of volatile memory, such as random-access memory (RAM) 108 and/or cache memory 110. Data processing system 100 also can include other removable/non-removable, volatile/non-volatile computer storage media. By way of example, storage system 112 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 106 by one or more data media interfaces. Memory 104 is an example of at least one computer program product.

Program/utility 114, having a set (at least one) of program modules 116, may be stored in memory 104. Program/utility 114 is executable by processor 102. Program/utility 114 and any data items used, generated, and/or operated upon by data processing system 100 are functional data structures that impart functionality when employed by data processing system 100.

By way of example, program modules 116 may represent an operating system, one or more application programs, other program modules, and program data. Program modules 116 generally carry out the functions and/or methodologies of the example implementations described within this disclosure. For example, one or more of program modules 116, upon execution by processor 102, may implement drivers used to communicate with circuit board 120, perform the various operations described within this disclosure, and/or perform an implementation or design flow (e.g., high-level synthesis, synthesis, placement, and/or routing) on a circuit design or portion thereof. In this regard, data processing system 100 is an example of an EDA system.

Data processing system 100 may include one or more Input/Output (I/O) interfaces 118 communicatively linked to bus 106. I/O interface(s) 118 allow data processing system 100 to communicate with one or more external devices and/or communicate over one or more networks such as a local area network (LAN), a wide area network (WAN), and/or a public network (e.g., the Internet). Examples of I/O interfaces 118 may include, but are not limited to, network cards, modems, network adapters, hardware controllers, etc. Examples of external devices also may include devices that allow a user to interact with data processing system 100 (e.g., a display, a keyboard, and/or a pointing device) and/or other devices such as circuit board 120.

In an example implementation, I/O interface 118 may be implemented as a PCIe adapter capable of communicating with circuit board 120 via a communication link such as a PCIe communication channel. In an example implementation, circuit board 120 may be inserted into a card slot, e.g., an available bus and/or PCIe slot, of data processing system 100. Circuit board 120 includes IC 122. Circuit board 120 also includes volatile memory 124 coupled to IC 122 and a non-volatile memory 126 also coupled to IC 122. Volatile memory 124 may be implemented as a RAM. In the example of FIG. 1, volatile memory 124 is external to IC 122, but is still considered a "local memory" of IC 122, whereas memory 104, being within data processing system 100, is not considered local to IC 122. Non-volatile memory 126 may be implemented as flash memory. Non-volatile memory 126 is also external to IC 122 and may be considered local to IC 122.

IC 122 may be implemented as a programmable IC. A programmable IC is an IC that includes at least some programmable circuitry. Examples of programmable ICs may include, but are not limited to, Field Programmable Gate Arrays (FPGAs), System-on-Chips (SoCs) having at least some programmable circuitry (e.g., programmable logic), Application-Specific ICs including at least some programmable circuitry, or other types of ICs that include programmable circuitry. Programmable logic is a type of programmable circuitry. IC 122 may include one or more subsystems therein. Examples of the subsystems may include a data processing engine array having a plurality of hardwired and programmable data processing engines, a programmable Network-on-Chip (NoC), programmable logic, and/or a processor system having one or more processors and optionally one or more hardwired peripheral circuit blocks. IC 122 may also include one or more hardwired circuit blocks (e.g., Application-Specific Hardwired Circuit Blocks).

Data processing system 100 is only one example implementation. Data processing system 100 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices. The example of FIG. 1 is not intended to suggest any limitation as to the scope of use or functionality of example implementations described herein. Data processing system 100 is an example of computer hardware that is capable of performing the various operations described within this disclosure.

In this regard, data processing system 100 may include fewer components than shown or additional components not illustrated in FIG. 1 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Data processing system 100 may be operational with numerous other general-purpose or special-purpose computing system environments or configurations. Examples of computing systems, environments, and/or configurations that may be suitable for use with data processing system 100 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Some computing environments, e.g., cloud computing environments and/or edge computing environments using data processing system 100 or other suitable data processing system, generally support the FPGA-as-a-Service (FaaS) model. In the FaaS model, user functions are hardware accelerated as circuit designs implemented within programmable ICs operating under control of the (host) data processing system. Other examples of cloud computing models are described in the National Institute of Standards and Technology (NIST) and, more particularly, the Information Technology Laboratory of NIST.

Figure 2:
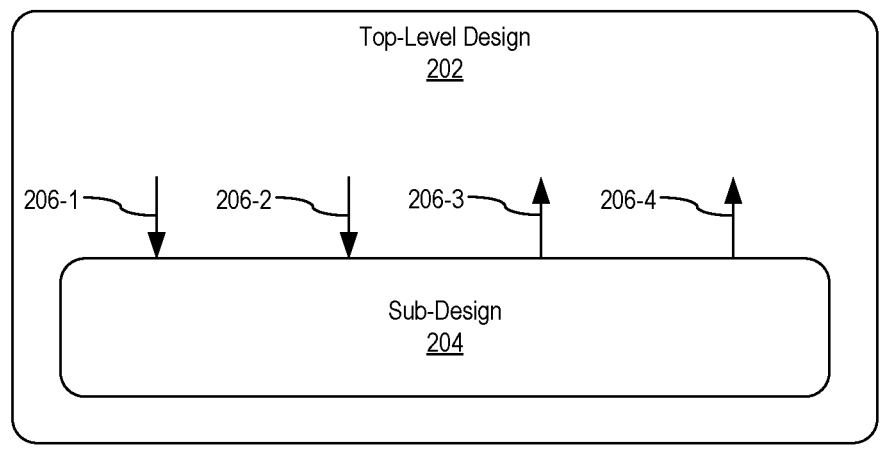
FIG. 2 illustrates an example partitioning operation performed on a circuit design.

FIG. 2 illustrates an example partitioning operation performed on a circuit design 200 by data processing system (system) 100. Circuit design 200 may be specified as one or more files stored in memory of system 100. In one aspect, circuit design 200 may be specified in an HDL.

As defined herein, the term "hardware description language" or "HDL" is a computer-language that facilitates the documentation, design, and manufacture of a digital system, such as an IC. An HDL is expressed in human readable form and combines program verification techniques with expert system design methodologies. Using an HDL, for example, a user can design and specify an electronic circuit, describe the operation of the circuit, and create tests to verify operation of the circuit. An HDL includes standard, text-based expressions of the spatial and temporal structure and behavior of the electronic system being modeled. HDL syntax and semantics include explicit notations for expressing concurrency. In contrast to most high-level programming languages, an HDL also includes an explicit notion of time, e.g., clocks and/or clock signals, which is a primary attribute of a digital system. For example, an HDL design may describe the behavior of a circuit design as data transfers occur between registers each clock cycle. Examples of HDLs may include, but are not limited to, Verilog and VHDL. HDLs are sometimes referred to as register transfer level (RTL) descriptions of circuit designs and/or digital systems. Both Verilog and VHDL support the ability to specify attributes on modules in their native syntax. SystemC, though specified as a high-level programming language, includes the notion of time and concurrency and may be considered another example of an HDL.

System 100 is capable of analyzing circuit design 200 to detect one or more portions of circuit design 200 that are coupled via stream channels. In the example of FIG. 2, circuit design 200 includes a first portion referred to as top-level design 202 and a second portion referred to as sub-design 204. In one aspect, top-level design 202 and sub-design 204 are examples of partitions. Circuit design 200, for example, may be a hierarchical circuit design.

In the example, sub-design 204 is communicatively linked to other circuit structures, e.g., components such as Intellectual Property (IP) cores, in top-level design 202 via one or more stream channels 206. Different portions of circuit design 200, whether IP cores, components, or sub-designs, may be interconnected by stream channels. For example, sub-design 204 may be an IP core or a plurality of IP cores. The IP cores of sub-design 204 may communicate with one or more other IP cores within top-level design 202 by way of stream channels 206. The IP cores of top-level design 202 are considered external to sub-design 204.

As defined herein, the term "Intellectual Property core" or "IP core" means a pre-designed and reusable unit of logic design, a cell, or a portion of chip layout design in the field of electronic circuit design. An IP core may be expressed as a data structure specifying a description of circuitry that performs a particular function. An IP core may be expressed using HDL file(s), as a netlist, as a bitstream that programs a programmable IC, or the like. An IP core may be used as a building block within circuit designs adapted for implementation within an IC.

An IP core may include additional resources such as source code, scripts, high-level programming language models, schematics, documentation, constraints, and the like. Examples of different varieties of IP cores include, but are not limited to, digital signal processing (DSP) functions, memories, storage elements, math functions, etc. Some IP cores include an optimally floorplanned layout targeted to a specific family of ICs. IP cores may be parameterizable in that a user may enter a collection of one or more parameters, referred to as a "parameterization," to activate or change certain functionality of an instance of an IP core.

Stream channels 206 are point-to-point, on-chip communication links that convey stream data. Each of stream channels 206 is capable of implementing a handshaking mechanism. For purposes of illustration, stream channels 206-1 and 206-2 are master stream channels, while stream channels 206-3 and 206-4 are slave stream channels. The arrows indicate flow control of the respective stream channels.

For purposes of illustration, stream channels 206 may be implemented as Advanced Microcontroller Bus Architecture (AMBA) eXtensible Interface (AXI) (hereafter "AXI") stream channels. AXI is provided as an illustrative example of a streaming interconnect for implementing stream channels. It should be appreciated that other similar and/or equivalent protocols and/or interconnects may be used in lieu of AXI.

The particular number of stream channels shown in FIG. 2 is provided for purposes of illustration. Circuit design 202 may include fewer or more stream channels. Further, the partitioning of circuit design 200 into two separate portions (e.g., top-level design 202 and sub-design 204) is for purposes of illustration. A circuit design may be partitioned into more than two portions based on the connectivity of portions of the circuit design using stream channels.

Figure 3:
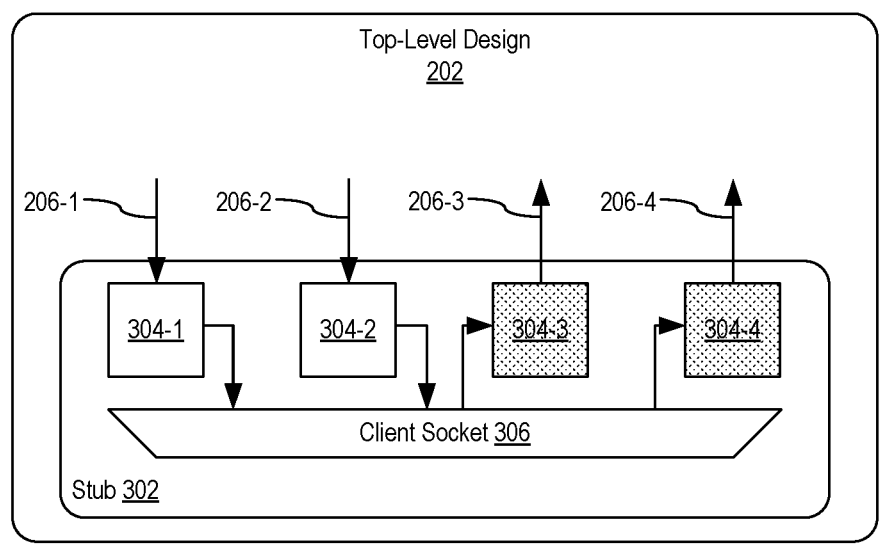
FIG. 3 illustrates replacement of a sub-design in a circuit design by a stub.

FIG. 3 illustrates replacement of sub-design 204 in circuit design 200 by stub 302. In the example of FIG. 3, system 100 removes sub-design 204 from circuit design 200. Sub-design 204 may be extracted as a separate circuit design (e.g., file or files). System 100 replaces sub-design 204 with stub 302. Stub 302 includes a plurality of socket IP cores 304. Socket IP cores 304 may be specified in HDL. For example, system 100 generates stub 302 to include one socket IP core 304 for each of the stream channels that connects top-level design 202 with sub-design 204 and is severed in removing sub-design 204 from circuit design 200.

Socket IP cores 304 may be slaves or masters depending on the particular type of stream channel to which each socket IP core connects. For example, socket IP core 304-1 couples to slave stream channel 206-1 and is implemented as a slave socket IP core. Socket IP core 304-2 couples to slave stream channel 206-2 and is implemented as a slave socket IP core. Socket IP core 304-3 couples to master stream channel 206-3 and is implemented as a master socket IP core. Socket IP core 304-4 couples to master stream channel 206-4 and is implemented as a master socket IP core. For purposes of illustration, shading is used to indicate master socket IP cores as distinguished from slave socket IP cores.

Sub-design stub 302 further includes a client socket 306. Client socket 306 may be implemented using an HLPL. In one aspect, socket IP cores 304 may use Direct Programming Interface (DPI) for C (DPI-C) to invoke HLPL functions and interact with client socket 306. It should be appreciated that techniques other than DPI-C may be used for invoking HLPL functions from an HDL block.

As defined herein, the term "high-level programming language" or "HLPL" means a programming language, or set of instructions, used to program a data processing system where the instructions have a strong abstraction from the details of the data processing system, e.g., machine language. For example, a high-level programming language may automate or hide aspects of operation of the data processing system such as memory management. The amount of abstraction typically defines how "high-level" the programming language is. Using a high-level programming language frees the user from dealing with registers, memory addresses, and other low-level features of the data processing system upon which the high-level programming language will execute. In this regard, a high-level programming language may include little or no instructions that translate directly, on a one-to-one basis, into a native opcode of a central processing unit (CPU) of a data processing system. Examples of high-level programming languages include, but are not limited to, C, C++, or the like.

Figure 4:
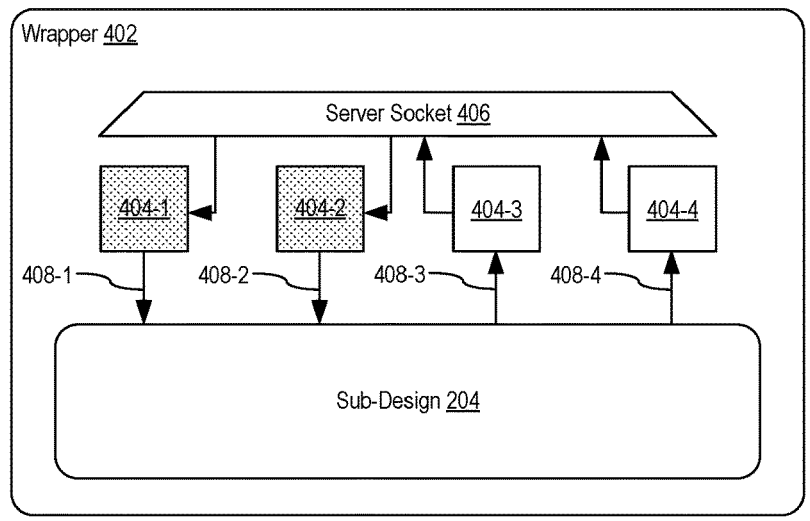
FIG. 4 illustrates example processing of a sub-design once removed from a circuit design.

FIG. 4 illustrates example processing of sub-design 204 once removed from circuit design 202 as performed by system 100. In the example of FIG. 4, system 100 adds a wrapper 402 to sub-design 204. Wrapper 402 may include a plurality of socket IP cores 404 that couple to sub-design 204 via stream channels 408. Socket IP cores 404 couple to server socket 406. For example, system 100 generates wrapper 402 to include one socket IP core 404 for each of the stream channels that connects top-level design 202 with sub-design 204 and is severed in removing sub-design 204 from circuit design 200.

Socket IP cores 404 may be specified in HDL. Socket IP cores 404 may be slaves or masters depending on the particular type of stream channel to which each socket IP core connects. In general, the master-slave socket IP core implementation of wrapper 402 will be the inverse of stub 302. For example, socket IP core 404-1 couples to slave stream channel 408-1 and is implemented as a master socket IP core to driver the slave stream channel 408-1. Socket IP core 404-2 couples to slave stream channel 408-2 and is implemented as a master socket IP core to drive slave stream channel 408-2. Socket IP core 404-3 couples to master stream channel 408-3 and is implemented as a slave socket IP core to receive data via master stream channel 408-3. Socket IP core 404-4 couples to master stream channel 408-4 and is implemented as a slave socket IP core to receive data via master stream channel 408-4. Server socket 406 may be implemented using an HLPL. In one aspect, socket IP cores 404 may use DPI-C or other similar or equivalent communication technique to invoke HLPL functions and interact with server socket 406.

Figure 5:
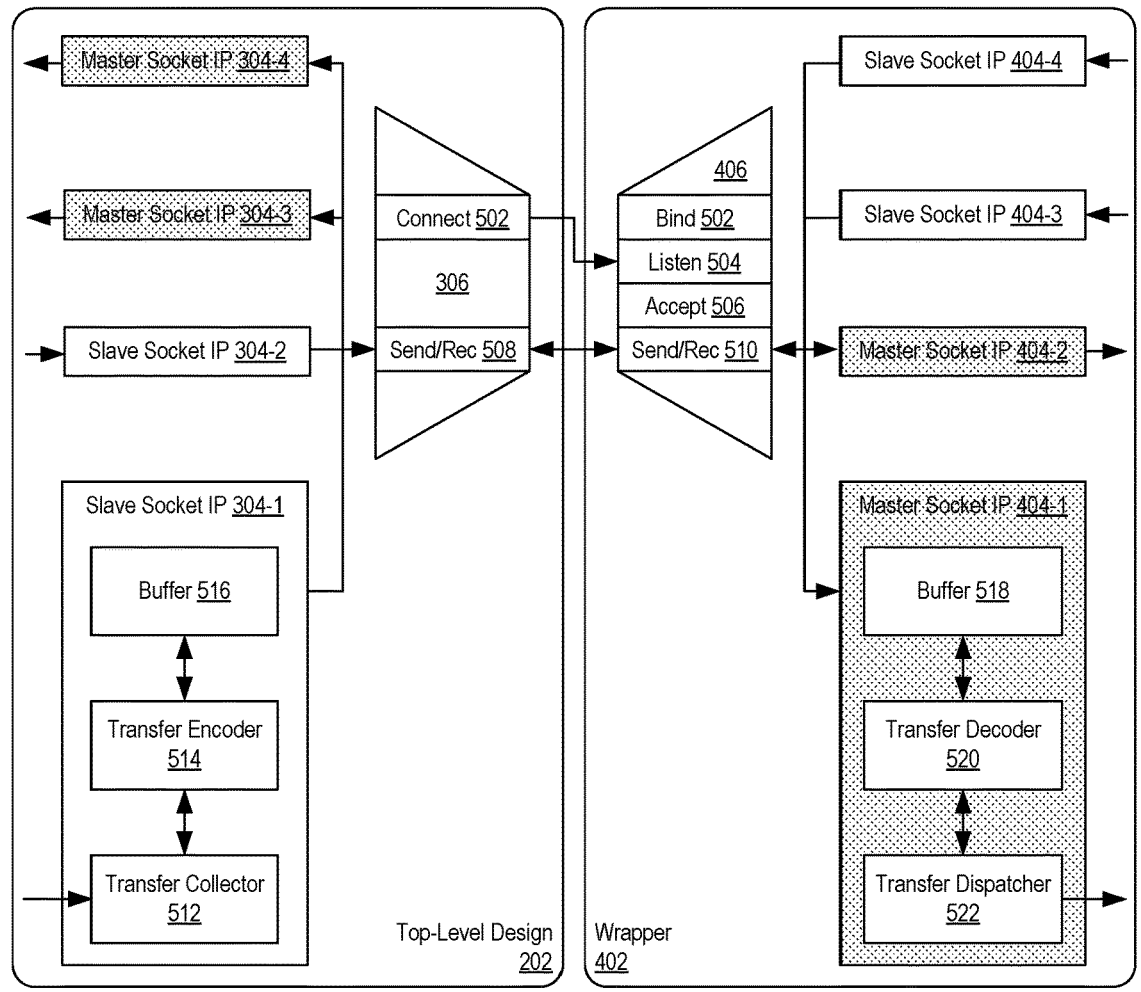
FIG. 5 illustrates example communication between the socket Intellectual Property (IP) cores of a top-level design and the socket IP cores of a sub-design.

FIG. 5 illustrates communication between the socket IP cores of top-level design 202 and the socket IP cores 404 of sub-design 204. In the example of FIG. 5, top-level design 202 may be compiled into a top-level simulation kernel that executes in a first process, e.g., a process in which only the top-level simulation kernel is executed. Sub-design wrapper 402 may be compiled into a sub-design simulation kernel that executes in a second process, e.g., a process in which only the sub-design simulation kernel is executed.

Client socket 306 is capable of communicating with server socket 406 via a connection-oriented client-server model using a shared port number. Client socket 306 is configured to request services from server socket 406. By separating top-level design 202 from sub-design 204 as shown, each may be simulated in a different process of a computer (e.g., system 100). In one or more other example implementations, each may be simulated in a different computer where the computers are interconnected.

In an example implementation, bind function 502 of server socket 406 is capable of establishing or binding an address that client socket 306 may use to locate server socket 406. It should be appreciated that in the case where multiple sub-designs are processed as described herein, each may be compiled into a sub-design simulation kernel that communicates with server socket 406 as described. Server socket 406 is capable of listening, using listener function 504, for requests from connect function 502 of client socket 306. Server socket may accept the request by way of accept function 506. Data is exchanged between send/receive function 508 of client socket 306 and send/receive function 510 of server socket 406.

In the example, slave socket IP core 304-1 (and/or slave socket IP core 404-4) can include a transfer collector 512, a transfer encoder 514, and a buffer 516. Each slave socket IP core 304, 404 may be implemented as described. Transfer collector 512 is configured to receive data via an HDL stream channel from any master components, e.g., kernels and/or IP cores coupled to slave socket IP core 304-1 in top-level design 202 or coupled to slave socket IP core 404-4 in sub-design 204. Transfer encoder 514 is configured to encode data received by transfer collector 512 for transfer over the socket connection established between client socket 306 and server socket 406. Buffer 516 is configured to temporarily store the encoded data of a stream data transfer until the encoded data can be transferred over the socket connection between client socket 306 and server socket 406.

In the example, master socket IP 304-4 (and/or master socket 404-1) can include a buffer 518, a transfer decoder 520, and a transfer dispatcher 522. Each master socket IP core 304, 404 may be implemented as described. Buffer 518 is configured to temporarily store encoded data, e.g., encoded stream data transfers, conveyed over the socket connection between client socket 306 and server socket 406. Transfer decoder 520 is configured to read data from buffer 518 and decode the data from the format used to transfer over the socket connection to a stream channel format (e.g., as an HDL data transfer). Transfer dispatcher 522 is capable of sending the data via a stream channel to any slave components, e.g., kernels and/or IP cores, of top-level design 202 coupled to master socket IP core 304-4 and/or of sub-design 204 coupled to master socket IP core 404-1.

In the example, if buffer 516 of a slave socket IP core 304, 404 has space to receive data, the slave socket IP core 304, 404 may continually be in a ready state and receive data. In response to buffer 516 being full, the "READY" signal may be turned off to stall the data flow from the master components coupled thereto. Similarly, the master socket IP cores 304, 404 are configured to continually provide valid data to slave components coupled thereto for so long as space is available in buffer 518 (e.g., a RAM). This configuration allows each simulation kernel to run independently of other simulation kernels and for longer durations.

The top-level simulation kernel is capable of periodically synchronizing the buffers of the master and slave socket IP cores. The synchronization may be triggered in response to a buffer being full or where a substantial number of clock cycles (e.g., a predetermined number of clock cycles) have passed since the last synchronization operation. During the synchronization process, client socket 306 is capable of checking for space availability in buffers 518 of master socket IP cores 404 on the server socket 406 side. In response to determining that buffers 518 have available space, client socket 306 is capable of collecting data from buffers 516 of slave socket IP cores 304 in top-level design 202 and sending the data over the socket connection to server socket 406. Server socket 406 is capable of distributing the received data to the intended master socket IP cores connected to server socket 406. Data received by master socket IP cores can be decoded and dispatched as stream data. During synchronization, client socket 306 is capable of informing server socket 406 of available space in buffers 518 of master socket IP cores 304. Client socket 306 is capable of receiving data from buffers 516 of slave socket IP cores 404. The received data may be stored in buffers 518, decoded, and dispatched.

Figure 6:
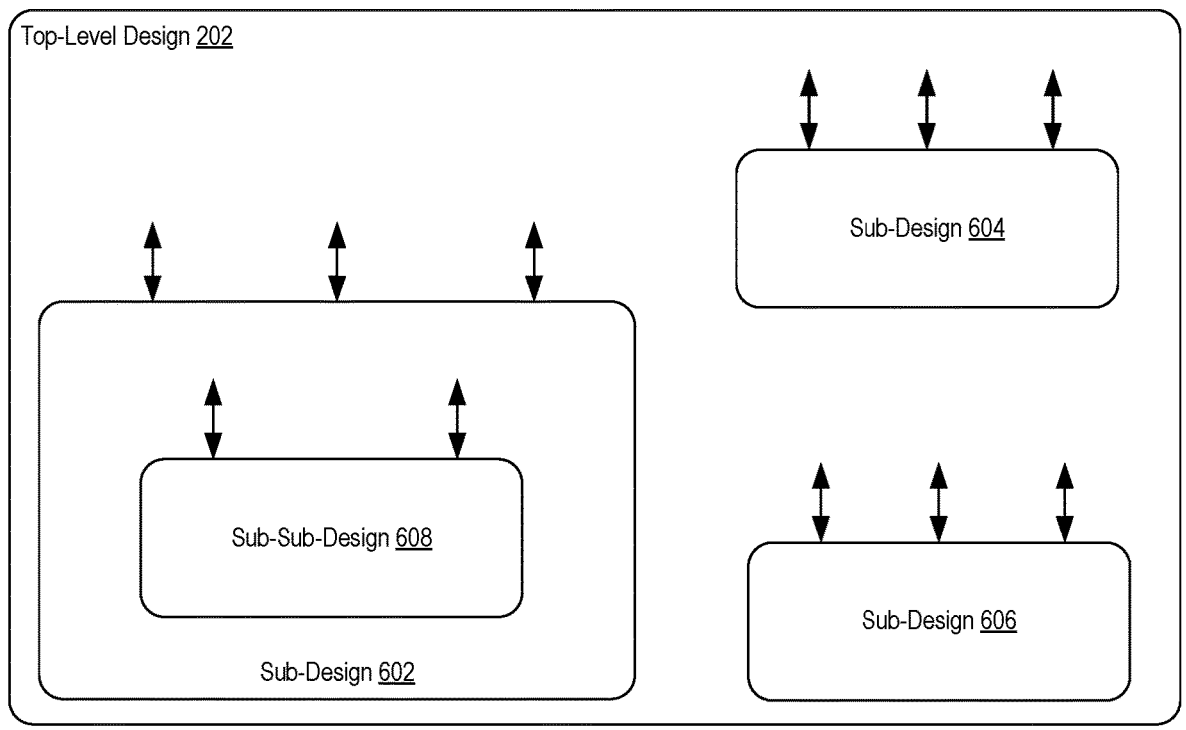
FIG. 6 illustrates an example partitioning operation applied to a circuit design including multiple hierarchies.

FIG. 6 illustrates an example partitioning operation for a circuit design including multiple hierarchies. In the example of FIG. 6, the partitioning techniques described in connection with FIGS. 2-5 are expanded to cases with multiple hierarchies resulting in multiple processes. In the example of FIG. 6, circuit design 200 includes 3 sub-designs 602, 604, and 606. Each of sub-designs 602, 604, and 606 communicates with components of circuit design 200 that are external to the respective sub-design by way of stream channels. Sub-design 602 includes a further sub-design shown as "sub-sub-design 608" that also communicates with circuitry in sub-design 602 using stream channels.

In one aspect, system 100 is capable of compiling a plurality of different portions of circuit design 200 coupled by stream channels into separate simulation kernels. System 100 is capable of generating a stub in top-level design for each sub-design that is created generated from the partitioning. Top-level design 202 is capable of instantiating the generated stubs and may be compiled to create a top-level simulation kernel. The top-level simulation kernel may be a test bench.

To facilitate communication between client sockets and the server socket, system 100 allocates ports to the sockets. The number of ports to be allocated will correspond to the number of sub-designs that are separated out into independent simulation kernels. If, for example, circuit design 200 includes 3 sub-designs, system 100 will need to allocate at least 3 unique port numbers so that the 3 client sockets may communication with the server socket. If circuit design 200 includes additional hierarchy, more ports may need to be allocated.

In the example of FIG. 6, 4 ports are needed. System 100 allocates 2 ports to sub-design 602, 1 port to sub-design 604, and 1 port to sub-design 606. For a non-top partition of a circuit design, the number of ports needed may be calculated according to the expression $1+\Sigma$ SubDesignPorts. System 100 is capable of storing the number of ports that are needed. In one aspect, the stored number of ports may be used by system 100 to compute the ports needed for the top-level circuit design.

System 100 is also capable of generating a run script corresponding to each level of hierarchy of circuit design 200. The run script, upon execution, is capable of using a base port number to assign ports to each sub-design of the level of hierarchy, call run-scripts of the sub-designs with the assigned ports to start the simulation kernels, and run the current simulation kernel as a client to the server (e.g., top-level simulation kernel) with the base port number.

System 100 may also execute a run script for the top-level design. The top-level design may be a testbench with the base port number. The run script for the top-level design may hierarchically assign ports to each process in a top-down fashion. The run script for the top-level design is capable of starting the simulation processes using a bottom-up approach where the server (e.g., top-level simulation kernel) is started prior to the clients. This facilitates multiple simulation kernels running independently and communicating via a socket-based connection as needed. The simulation architecture described provides for parallel execution of the simulation in multiple different processes to improve simulation performance.

Figure 7:
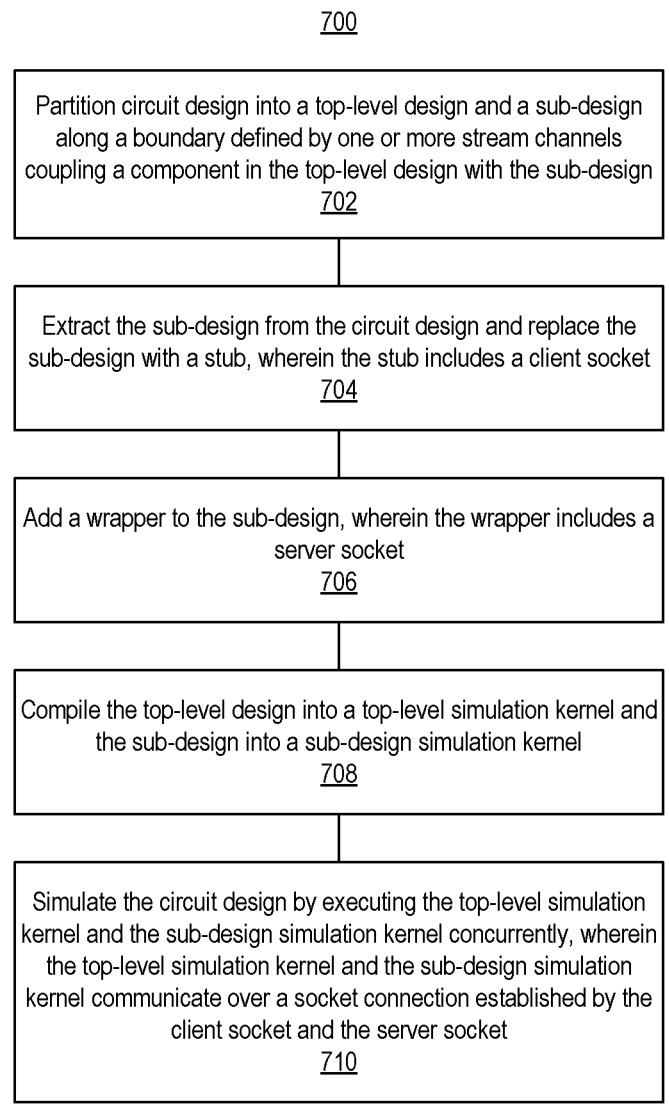
FIG. 7 depicts an example of a computer-based method of simulating a circuit design.

FIG. 7 depicts an example of a computer-based method 700 of simulating a circuit design. Method 700 may be performed by system 100 of FIG. 1. In block 702, the system is capable of partitioning a circuit design into a top-level design and a sub-design (e.g., two or more partitions). The circuit design may be specified in an HDL. The partitioning may be performed along a boundary detected in the circuit design that is defined by one or more stream channels coupling one or more components in the top-level design with the sub-design (e.g., one or more components in the sub-design). That is, the system is capable of partitioning the circuit design through the stream channels.

In one or more example implementations, the system is capable of automatically partitioning the circuit design based on the existence of stream channels connecting different portions of the circuit design. In other example implementations, the system is capable of partitioning the circuit design in accordance with user selected stream channels defining the resulting partitions.

In block 704, the system is capable of extracting the sub-design from the circuit design and replacing the sub-design with a stub. The extracted sub-design may be stored as a separate circuit design in the system. The stub may include a client socket. The client socket may be specified in an HLPL.

In block 706, the system is capable of adding a wrapper to the sub-design as extracted from the circuit design. The wrapper may include a server socket. The server socket may be specified in an HLPL. In the case where the circuit design is partitioned so that a plurality of sub-designs are extracted, a wrapper may be added to each sub-design.

In block 708, the system is capable of compiling the top-level design and the sub-design into a top-level simulation kernel and a sub-design simulation kernel. In the case where a plurality of sub-designs are extracted, each may be compiled into a different and independent sub-design simulation kernel.

In one or more example implementations, as part of the compiling process, the system is capable of determining a number of ports that are needed and allocating the ports to the sub-designs and to the top-level design for use in the compiling.

In block 710, the system is capable of simulating the circuit design by executing the top-level simulation kernel and the sub-design simulation kernel(s) concurrently. The top-level simulation kernel and the sub-design simulation kernel, during the simulation, communicate over a socket connection established by the client socket and the server socket. In the case where multiple sub-design simulation kernels are executing, each may communicate with the top-level simulation kernel via a separate or different socket connection.

The foregoing and other implementations can each optionally include one or more of the following features, alone or in combination. Some example implementations include all the following features in combination.

The stub may include a slave socket IP core and a master socket IP core that connect a circuit component of the top-level design with the client socket. The slave socket IP core and the master socket IP core may be specified in an HDL. In general, the system is capable of including one master socket IP core and one slave socket IP core within the stub for each stream channel that is severed by the partitioning of block 702 and/or extraction of block 704. In one or more example implementations, for each sub-design of the circuit design, the system may extract the sub-design and replace the sub-design with a stub in the top-level design.

In one aspect, the wrapper includes a slave socket IP core and a master socket IP core that connect the sub-design with the server socket. The slave socket IP core and the master socket IP core may be specified in an HDL. In general, the system is capable of including one master socket IP core and one slave socket IP core within the stub for each stream channel that is severed by the partitioning of block 702 and/or extraction of block 704.

In one aspect, the top-level simulation kernel and the sub-design simulation kernel execute in different processes of a data processing system.

The method can include compiling a further sub-design of the circuit design into partition circuitry for implementation in an IC coupled to a data processing system that is configured to execute at least one of the top-level simulation kernel or the sub-design simulation kernel. The further sub-design is partitioned along a boundary defined by one or more stream channels as described.

The method also may include performing hardware co-simulation of the circuit design by executing the at least one of the top-level simulation kernel or the sub-design simulation kernel using the data processing system in coordination with running the partition circuitry in the IC. At least one of the top-level simulation kernel or the sub-design simulation kernel communicates with the partition circuitry implemented in the IC over a communication link between the data processing system and the IC.

In another aspect, for the hardware co-simulation, at least one of the top-level design or the sub-design includes user-specified portions of the circuit design and the further sub-design includes one or more verified IP cores.

As discussed, in one or more example implementations, the partitioning described may be used in the context of hardware co-simulation. In that case, the one or more resulting partitions may be designated for simulation using a data processing while another partition is designated for implementation as circuitry in an IC coupled to the data processing system as illustrated in the example of FIG. 1. In the hardware co-simulation case, the top-level design may be simulated using the data processing system along with one or more sub-systems as described. A further sub-system may be designated for implementation in an IC to execute therein in coordination with the data processing system. In the case of hardware co-simulation, while each partition that executes within the data processing system may execute as a separate process as described, this need not be the case.

Figure 8:
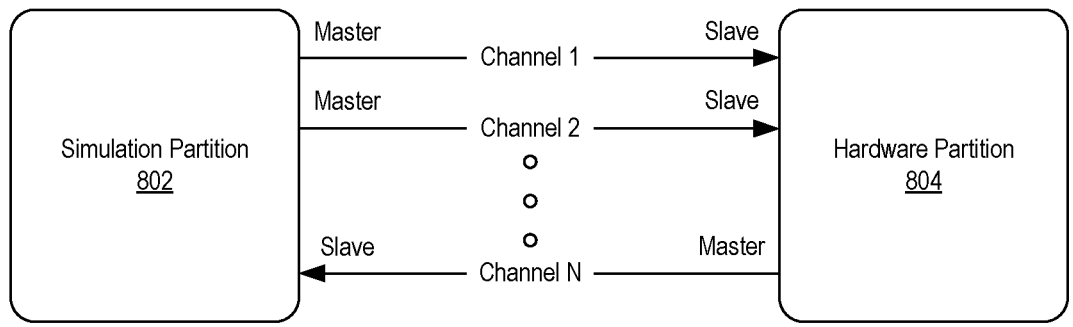
FIG. 8 illustrates an example of a circuit design partitioned along stream channel boundaries for hardware co-simulation.

FIG. 8 illustrates an example of circuit design 200 partitioned along stream channel boundaries for hardware co-simulation. Hardware co-simulation involves simulating a portion of a circuit design using a data processing system, while another portion of the circuit design is implemented in circuitry in an IC. The simulation executing in the data processing system executes in coordination with the portion of the circuit design operating in the IC. In the example of FIG. 8, circuit design 200 is partitioned into a first portion referred to as simulation partition 802 and a second portion referred to as hardware partition 804. In one aspect, simulation partition 802 may be a top-level circuit design while hardware partition 804 is a sub-design. Further, it should be appreciated that simulation partition 802 may be subdivided into further partitions along stream channel boundaries if desired so that each resulting simulation partition executes in a separate process using the techniques described herein in connection with FIGS. 2-7.

In one or more example implementations, hardware partition 804 may include components (e.g., IP cores) that have been verified. For example, hardware partition 804 may include hard IP cores and soft IP cores. A hard IP core refers to an IP core that configures a hardwired circuit block in IC 122. Because the circuit block is hardwired, the hard IP core may be considered to be verified. That is, the functionality and operability of the hard IP core may have been verified. A soft IP core may also be verified in that the soft IP core implements a circuit block in programmable circuitry whose functionality and operability have been verified. Thus, IP cores that are known to be functional and operable may be assigned to hardware partition 804 while other IP cores, e.g., user-specified portions of circuit design 200, may be assigned to simulation partition 802. Still, the verified and unverified portions communicate via one or more stream channels. It should be appreciated that hardware portion 804 may include one or more components that also communication via stream channels. Such components need not be further partitioned as the stream channels may be realized in hardware in IC 122 as opposed to using the HDL and DPI-C mechanism described in the case of simulation.

As discussed, the arrows indicate flow control of the respective stream channels. Each stream channel includes a read channel and a write channel. The read channel may include a read address channel and a read data channel. The write channel may include a write address channel, a write data channel, and a write response channel.

Figure 9:
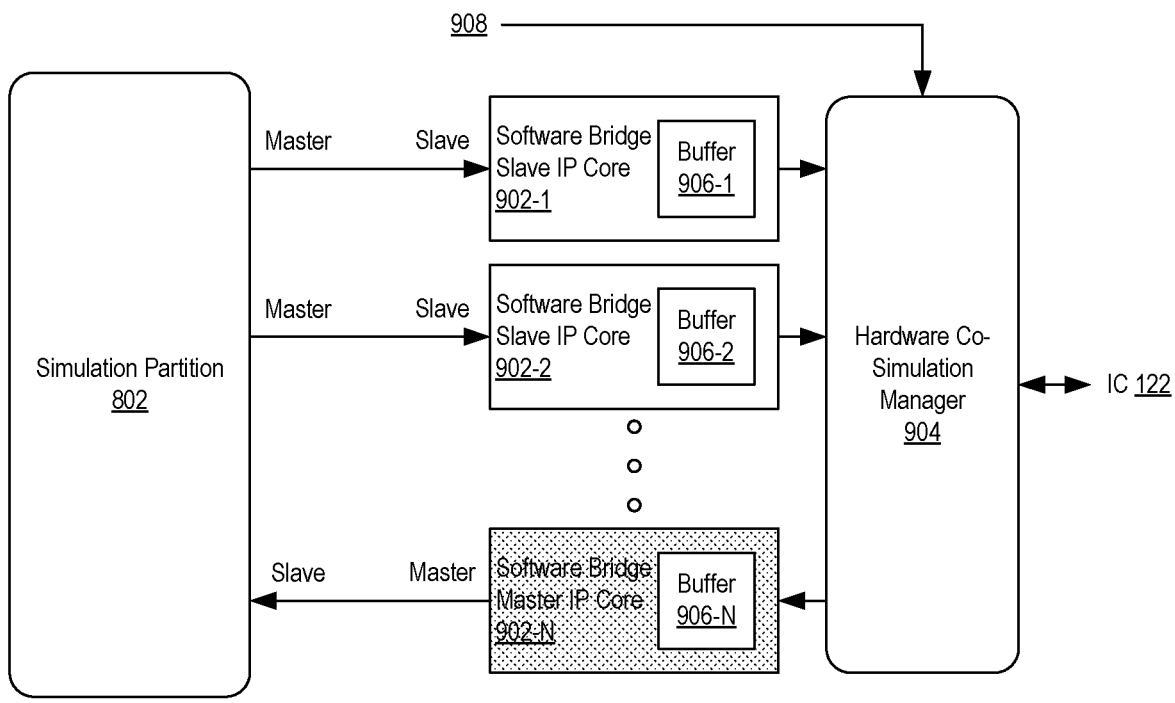
FIG. 9 illustrates example processing performed for a simulation partition.

FIG. 9 illustrates an example of processing performed by system 100 for simulation partition 802. In the example, system 100 has created a plurality of software bridge IP cores 902. Software bridge IP cores 902 couple to the existing stream channels of simulation partition 802 that previously connected to hardware partition 804. Software bridge IP cores 902 also connect to a hardware co-simulation manager 904.

In the example of FIG. 9, software bridge IP cores 902 include slaves and masters. A software bridge slave IP core 902 is inserted to connect to a corresponding master interface of simulation partition 802. A software bridge master IP core 902 is inserted to connect to a corresponding slave interface of simulation partition 802. In the example, each software bridge IP core includes a buffer 906.

In the example of FIG. 9, simulation partition 804 and software bridge IP cores 902 are specified in an HDL. Hardware co-simulation manager 904 may be specified in an HLPL. Software bridge IP cores 902 may use DPI-C or another similar or equivalent mechanism for communicating with hardware co-simulation manager 904. In the example, a customizable synchronization event 908 may be provided to hardware co-simulation manager 904. Simulation partition 802 and the various blocks added by system 100 as described in connection with FIG. 9 may be compiled into one or more simulation kernels for execution in system 100 or another similar data processing system.

In the example of FIG. 9, system 100 is capable of inserting one software bridge IP core 902 for each stream channel that is severed by the partitioning described.

Figure 10:
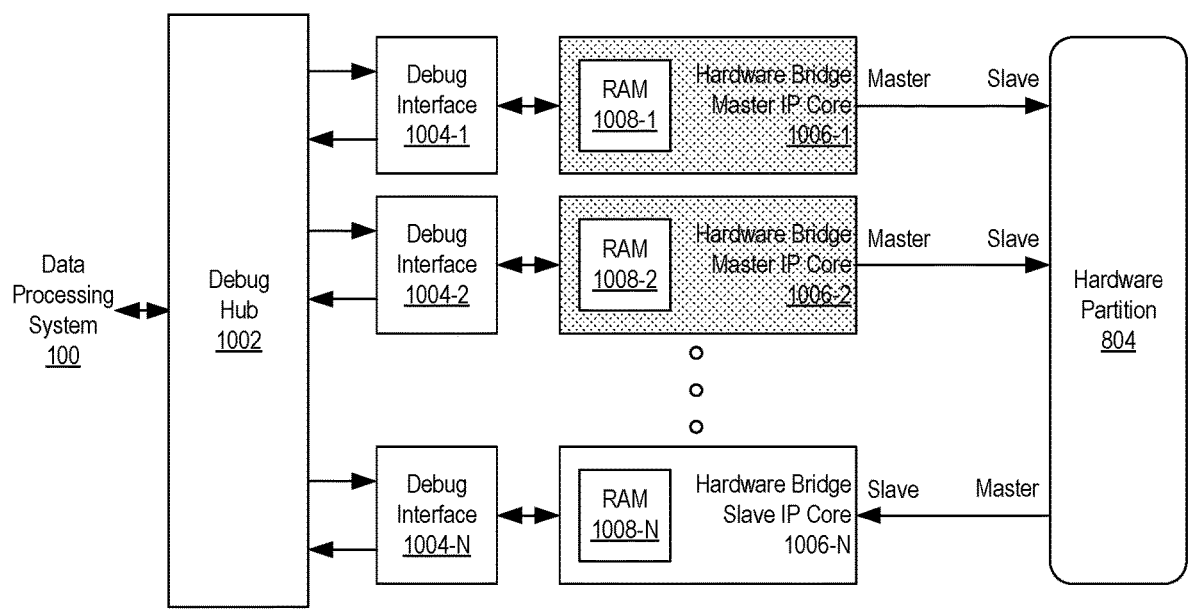
FIG. 10 illustrates example processing performed for a hardware partition.

FIG. 10 illustrates an example of processing performed by system 100 with for hardware partition 804. In the example, system 100 has inserted a debug hub 1002, a plurality of debug interfaces 1004, and a plurality of hardware bridge IP cores 1006. Hardware bridge IP cores 1006 couple to hardware partition 804. Each hardware bridge IP core 1006 includes a RAM 1008. Each of the hardware bridge IP cores 1006 couples to an existing stream channel of hardware partition 804 that previously connected to simulation partition 802. In the example of FIG. 10, system 100 is capable of inserting one debug interface 1004 and one hardware bridge IP core 1006 for each stream channel that is severed by the partitioning described. Hardware bridge IP cores 1006 may be slaves or masters. A hardware bridge slave IP core is inserted to connect to a corresponding master interface of hardware partition 804. A hardware bridge master IP core is inserted to connect to a corresponding slave interface of hardware partition 804.

Debug hub 1002, debug interfaces 1004, and hardware bridge IP cores 1006 may be specified in HDL and synthesized, placed, and routed with hardware partition 804 to be implemented in IC 122 as circuitry. For example, debug hub 1002, debug interfaces 1004, hardware bridge IP cores 1006, and hardware partition 804 may be extracted from circuit design 200 as a separate or independent circuit design and implemented using programmable circuitry and/or one or more hardwired circuit blocks of IC 122.

Debug hub 1002 and hardware co-simulation manager 904 in data processing system 100 are capable of communicating over the communication link coupling the respective systems. In an example implementation, debug hub 1002 may communicate with hardware co-simulation manager 904 using a debugging communication protocol that may be conveyed over the communication link described in connection with FIG. 1.

Debug hub 1002 is capable of encoding communications received from debug interfaces 1004 and provide the encoded communications to hardware co-simulation manager 904. Debug hub 1002 is also capable of decoding communications received from hardware co-simulation manager 904 to distribution to the correct debug interfaces 1004 based on the particular stream channel being decoded. Debug interfaces 1004 are capable of communication with hardware bridge IP cores 1006. Each hardware bridge master IP core 1006 is capable of formatting data received from debug interfaces 1004 as a data stream (e.g., an AXI data stream or data stream formatted using another streaming protocol) for conveyance via a hardware stream channel to hardware partition 804. Each hardware bridge slave IP core 1006 is capable of receiving a data stream (e.g., an AXI data stream or data stream formatted using another streaming protocol) over a hardware stream channel and formatting the data stream for conveyance to a debug interface 1004.

In an example implementation, debug interfaces 1004 may communicate data of a particular width, e.g., 32-bit data, to hardware bridge IP cores 1006. Hardware bridge IP cores may store data temporarily in RAMs 1008. For example, each hardware bridge IP core 1006 is capable of temporarily storing data in RAM 1008, decoding data from a connected debug interface 1004, and generating packets of stream data that may be provided to hardware partition 804.

Hardware partition 804 and the various blocks added by system 100 as described in connection with FIG. 10 may be compiled through a design flow (e.g., synthesis, placement, routing, and/or bitstream generation) and implemented as circuitry in IC 122.

In general, a stream channel sends packets of data in units called transfers. Each transfer occurs in a clock cycle in response to a master having valid data as indicated by a valid signal generated by the master and a slave being ready to receive the data as indicated by a ready signal generated by the slave. The data is conveyed as part of the transfer along with other optional data. The other optional data may include, but is not limited to, strobe, keep, last, source, destination, user side band, and the like. A packet of data may include a plurality of such transfers.

For each stream channel that connects components of circuit design 200 and that spans between simulation partition 802 and hardware partition 804, system 100 disconnects the components and inserts bridge IP cores on either side as described to facilitate hardware co-simulation of simulation partition 802 in coordination with hardware partition 804. The bridge IP cores that are inserted, e.g., software bridge IP cores 902 and/or hardware bridge IP cores 1006, include parameters set by system 100 from the partitioning operation. The parameters may specify details relating to the partitioned or severed stream channel such as a size of data being conveyed; values for stream control signals such as tstrb, tkeep, taast, tuser, and tid; a RAM depth and width in which transfers will be encoded/decoded; and a virtual address used to communicate to the counterpart of an IP bridge core in the other partition. System 100 is capable of automatically determining the virtual addresses and assigning the virtual addresses to the counterpart bridge IP cores to ensure proper communication between bridge IP cores.

Figure 11:
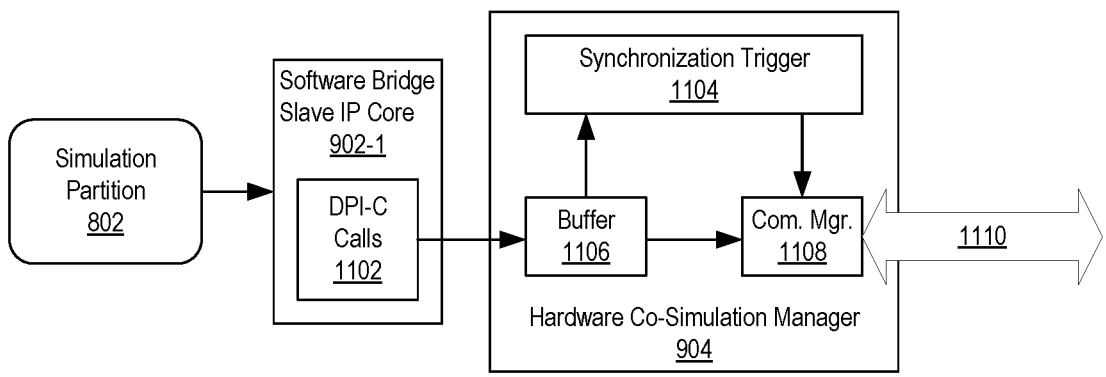
FIG. 11 illustrates an example implementation including a software slave IP core and a hardware co-simulation manager in greater detail.

FIG. 11 illustrates an example implementation including software slave IP core 902-1 and hardware co-simulation manager 904 in greater detail. Software bridge slave IP core 902-1 is capable of capturing transfers from simulation partition 802 and encoding the transfers. Encoded transfers, e.g., data, may be temporarily collected in buffer 906-1. In the example, software bridge slave IP core 902-1 uses DPI-C calls 1102 to communicate with hardware co-simulation manager 904. DPI-C calls 1102, for example, may be used to populate data into buffer 906-1 so that the data is available to, e.g., may be accessed by, hardware co-simulation manager 904.

Hardware co-simulation manager 904 may include a synchronization trigger 1104, a buffer 1106, and a communication manager 1108. Synchronization trigger 1104 is capable of tracking data transfers and generating a synchronization event in response to a configurable amount of transfers having been performed, e.g., a user-specifiable number of transfers or amount of data, or in response to a configurable amount of time passing since the previous synchronization event, e.g., a user-specifiable amount of time. During synchronization, command manager 1108 uses the virtual address assigned to the software bridge slave IP core 902-1 to generate the write commands to transfer data over communication link 1110.

In one or more examples, synchronization event 908 is implemented as an internal signal that is determined by the system. Synchronization event 908 may be user configurable and executed on the basis of time or buffer status. That is, the event may be executed in response to a predetermined and configurable amount of time passing since the last or most recent synchronization or in response to any of the buffers of the socket IP cores becoming full of data. Synchronization event 908 may initiate operation of synchronization trigger 1104 in each of the software bridge IP cores.

Figure 12:
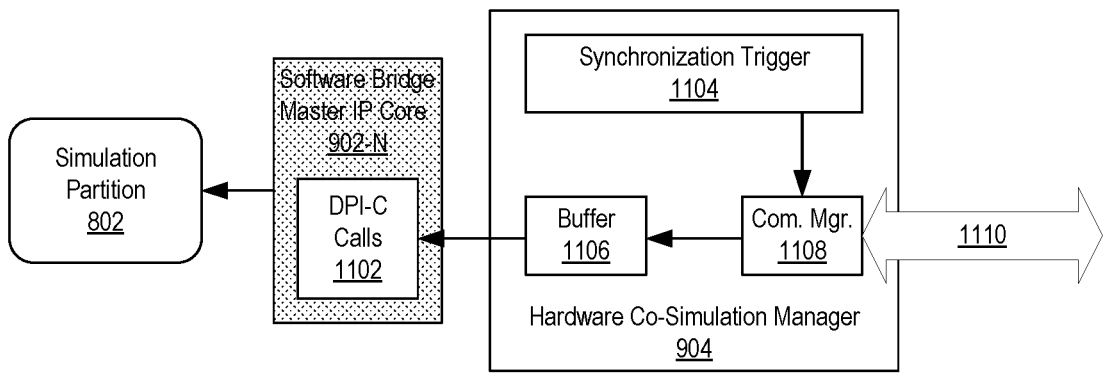
FIG. 12 illustrates an example implementation including a software master IP core and a hardware co-simulation manager in greater detail.

FIG. 12 illustrates an example implementation including software master IP core 902-N and hardware co-simulation manager 904 in greater detail. In the example of FIG. 12, a synchronization event generated by synchronization trigger 1104 is capable of populating buffer 1106 with transfers received from hardware partition 804 using read commands. When hardware bridge slave IP core 1006-N connected to software master bridge IP core 902-N issues a ready signal, the decoded data is passed from buffer 1106 to the slave component of simulation partition 802 through one or more DPI-C calls 1102.

In response to a synchronization event generated by a simulator executing software partition 802, some portion or all the encoded data collected so far in buffer 906 (RAM 1008) of each software bridge IP core 902 (hardware bridge IP core 1006) is moved to the corresponding bridge IP core in the other partition. For example, data is moved from buffers 906 of each software bridge slave IP core 902 to RAMs 1008 of each corresponding hardware bridge master IP core 1006. Similarly, data is moved from RAMs 1008 of each hardware bridge slave IP core 902 to buffers 906 of each corresponding software bridge master IP core 902.

Figure 13:
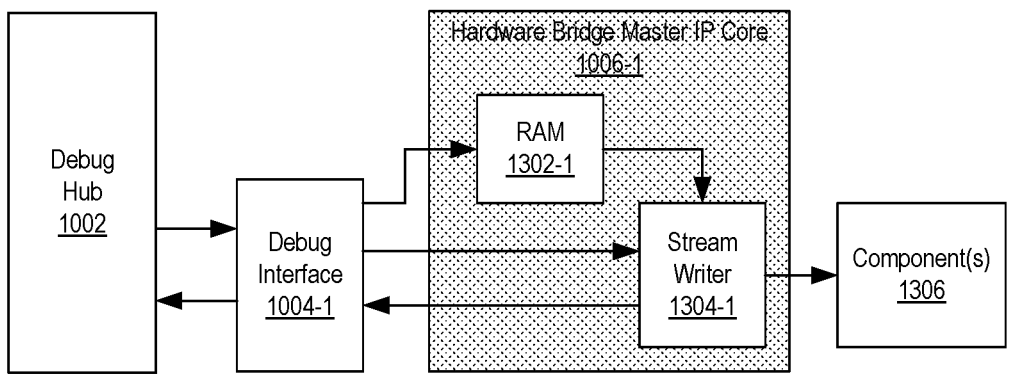
FIG. 13 illustrates an example implementation of a hardware bridge master IP core, a debug hub, and a debug interface.

FIG. 13 illustrates an example implementation of hardware bridge master IP core 1006-1, debug hub 1002, and debug interface 1004-1. In one or more arrangements, each hardware bridge master IP core 1006 may be implemented as illustrated in FIG. 13. Hardware bridge master IP core 1006-1 may include a RAM 1302-1 and a stream writer 1304-1. Data received from debug interface 1004-1 may be stored temporarily in RAM 1302-1. Debug interface 1004-1 may be coupled to stream writer 1304-1 by a write address channel and a read address channel. One or more additional channels may connect debug interface 1004-1 to stream writer 1304. In the example of FIG. 13, the data connections between debug interface 1004-1 and hardware bridge master IP core 1006-1 may be 32-bit data connections. In other example implementations, other bit widths may be used.

In response to data being available in RAM 1302-1, stream writer 1304-1 is capable of reading data from RAM 1302-1, decoding the data as stream channel transfers, and sending the decoded data to a slave port of the particular component(s) 1306 located in hardware partition 804 and connected to hardware bridge master IP core 1006-1. The data is conveyed by stream writer 1304-1 as a data stream over stream channels implemented in circuitry in IC 122. The hardware bridge master IP cores 1006 are capable of continuing to dispatch transfers to component(s) 1306 so long as valid data is stored in RAMs 1302-1.

Figure 14:
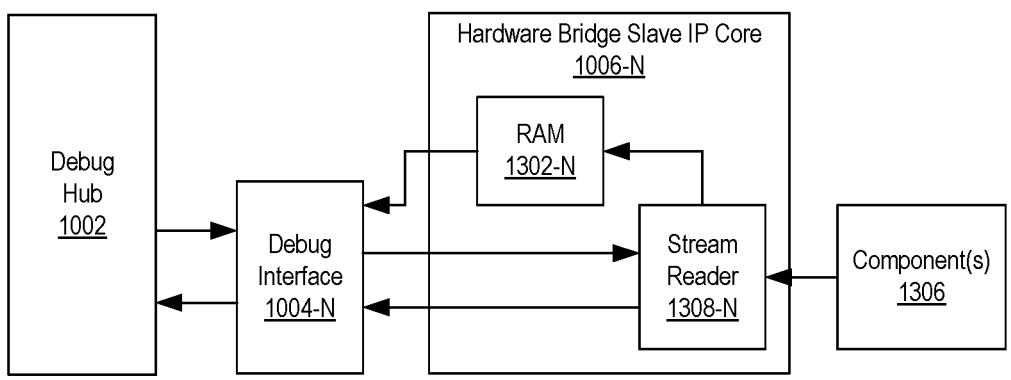
FIG. 14 illustrates an example implementation of a hardware bridge slave IP core, a debug hub, and a debug interface.

FIG. 14 illustrates an example implementation of hardware bridge slave IP core 1006-N, debug hub 1002, and debug interface 1004-N. In one or more arrangements, each hardware bridge slave IP core 1006 may be implemented as illustrated in FIG. 14. Hardware bridge slave IP core 1006-N may include a RAM 1302-N and a stream reader 1308-N. Data received from component(s) 1306 implemented in hardware partition 804 may be received by stream reader 1308-N and stored temporarily in RAM 1302-N. Stream reader 1308-N receives data streams conveyed over stream channels implemented in circuitry in IC 122. Debug interface 1004-N may be coupled to stream reader 1308-N by a write address channel and a read address channel. One or more additional channels may connect debug interface 1004-N to stream reader 1308-N. In the example of FIG. 14, the data connections between debug interface 1004-N and hardware bridge slave IP core 1006-N may be 32-bit data connections. In other example implementations, other bit widths may be used.

Stream reader 1308-N is capable of encoding any data received from component(s) 1306 as transfers that may be stored in RAM 1302-N. In response to receiving a synchronization event, the data stored in RAM 1302-N may be provided to hardware co-simulation manager 904 (e.g., by way of debug interface 1004-1 and debug hub 1002). Hardware Bridge Slave IP core 1006-N is capable of continually collecting data until RAM 1302-N is full.

Stream writers 1304 and stream readers 1308 are capable of customizing the width of data streams. That is, the width of the data channel from stream writers 1304 and/or stream readers 1308 may be a user-specified value (e.g., 32, 64, 128, 256 bits). Other aspects of the stream channel may also be user-specified such as whether the strobe is kept thereby allowing the data to be interpreted in a preferred or specified way. Information such as destination and source may be encoded in transfers thereby allowing stream writer 1304 to decode the data and output such data on the stream channel.

Any such data received by stream reader 1308 may be encoded and provided toward hardware co-simulation manager 904.

In the example of FIG. 13-14, a given component (e.g., an IP) may be coupled to multiple stream channels. That is, a component such as component 1306 may be coupled to more than one hardware bridge master IP core 1006 and to more than one hardware bridge slave IP core 1006 depending on the number of stream channels used by the component.

In one aspect, data movement from buffers 1106 to RAMs 1302 and vice versa is managed by hardware co-simulation manager 904. In response to a synchronization event, hardware co-simulation manager 904 is capable of checking for available space in RAM 1302. In one aspect, available space in RAM 1302 may be determined by the value of read address accessed from the hardware bridge master IP core 1006, where hardware co-simulation manager 904 may maintain or store the most recent or current read address accessed. During a synchronization, based on the available space, data is collected from buffers 1106 and moved to corresponding RAMs 1302. In one aspect, hardware co-simulation manager 904 may use Xilinx Virtual Cables (XVC) through Xilinx System Debugger (XSDB) Tcl interface to communicate to debug hub 1002.

Hardware co-simulation manager 904 is capable of detecting data stored in RAMs 1302 of hardware bridge slave IP cores by reading the write address accessed from the hardware bridge slave IP core 1006. Hardware co-simulation manager 904 is capable of copying the data back to buffers 1106 using a same or similar process (e.g., XVC using XSDB commands through debug hub 1002 interface).

In the examples of FIGS. 9-10, the size of buffers 906 and RAMs 1008 may be customized or specified on a per stream channel basis. Thus, some buffers 906 and RAMs 1008 may be of different size than others depending on the attributes (e.g., amount of data conveyed) by the respective stream channels. Larger sizes may reduce the frequency of synchronization operations across partitions and, as such, improve performance.

In terms of RAM 1008, any of a variety of different RAM circuit blocks may be used. For example, Lookup-table RAM, Block RAM, Ultra-RAM may be used based on the availability of the respective hardware circuit blocks in IC 122. In one aspect, the depth of the RAMS may be specified by the user. Synchronization may be triggered (e.g., cause a synchronization event to be generated or occur) by a buffer size reaching the full capacity for any of the master bridge IP cores. In other example implementations, the presence of T_LAST signal or other signal indicating the end of a packet in a data transfer may also trigger the occurrence or generation of a synchronization event.

In some cases, interdependent stream channels may experience a deadlock condition as some of the software may depend on the data to be received by some of the slave stream channels. To prevent such stalling, a synchronization event may also be generated or occur thereby causing a synchronization operation automatically after a predetermined and customizable amount of time after a prior synchronization operation or after a specified number of simulation time slots have been processed. Between synchronizations, the hardware partition 804, is capable of operating at the circuit clock speed in real time.

Figure 15:
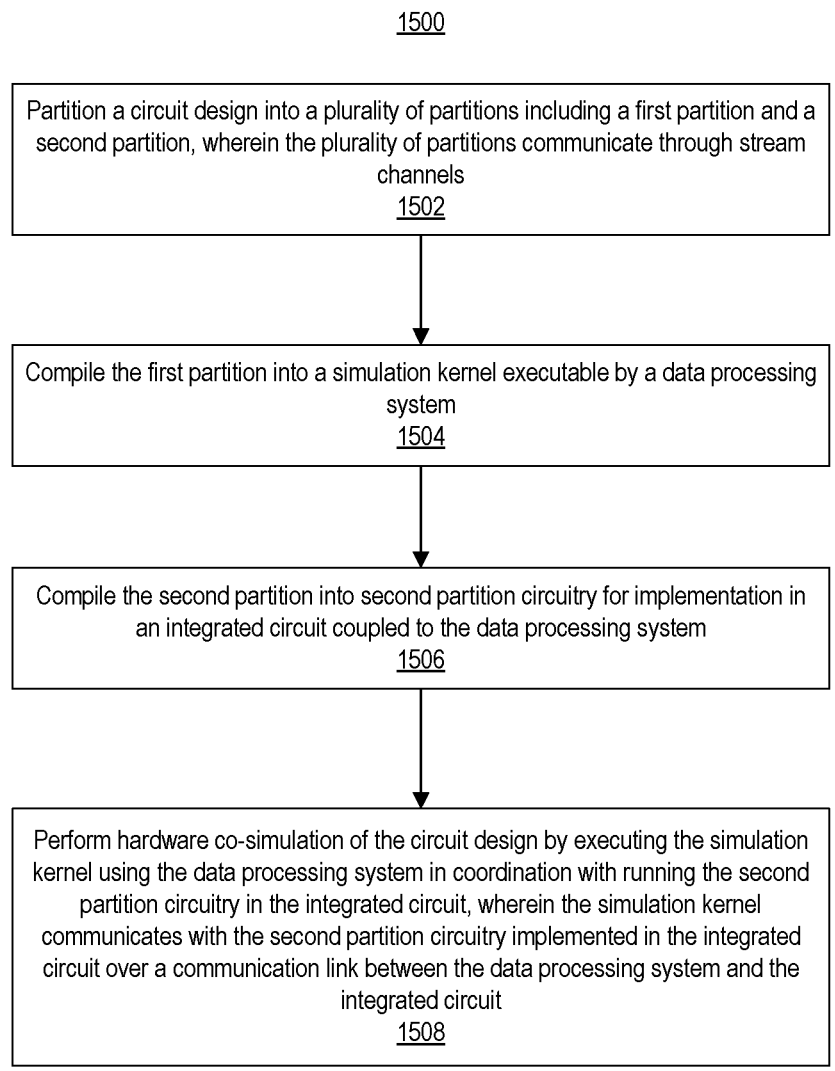
FIG. 15 is an example method of hardware co-simulation using the computing environment of FIG. 1.

FIG. 15 is an example method 1500 of hardware co-simulation using the computing environment of FIG. 1. In block 1502, system 100 is capable of partitioning a circuit design specified in an HDL into a plurality of partitions including a first partition and a second partition. The plurality of partitions communicate through stream channels. The partitioning may be performed automatically by system 100 or performed based on a user-specified stream channel boundaries.

In block 1504, system 100 is capable of compiling the first partition into a simulation kernel that is executable by system 100. In block 1506, system 100 is capable of compiling the second partition into second partition circuitry for implementation in IC 122 coupled to system 100.

In block 1506, hardware co-simulation of the circuit design is performed by executing the simulation kernel using system 100 (e.g., or another data processing system) in coordination with running the second partition circuitry in IC 122. The simulation kernel is capable of communicating with the second partition circuitry implemented in IC 122 over a communication link between system 100 and IC 122.

The foregoing and other implementations can each optionally include one or more of the following features, alone or in combination. Some example implementations include all the following features in combination.

In another aspect, system 100 is capable of connecting one or more software bridge slave IP cores and one or more software bridge master IP cores to the first partition. The one or more software bridge slave IP cores and the one or more software bridge master IP cores may be specified in an HDL. For example, system 100 is capable of inserting the bridge IP cores and making the connections described herein.

In another aspect, system 100 is capable of connecting each of the one or more software bridge slave IP cores and the one or more software bridge master IP cores to a hardware co-simulation manager. The hardware co-simulation manager is specified in an HLPL.

In another aspect, system 100 is capable of including a debug hub circuit block, a plurality of debug interface circuit blocks, one or more hardware bridge master IP cores, and one or more hardware bridge slave IP cores in the second partition. The debug hub circuit is capable of communicating over the communication channel. Each of the plurality of debug interface circuit blocks couples the debug hub circuit block to a respective one of the one or more hardware bridge master IP cores or to a respective one of the one or more hardware bridge slave IP cores.

In another aspect, each of the one or more hardware bridge master IP cores and each of the one or more hardware bridge slave IP cores connects to the second partition circuitry.

In another aspect, the one or more hardware bridge master IP cores are configured to decode data received from the data processing system resulting in decoded data and generate stream data from the decoded data over stream channels coupled to the second partition circuitry. The one or more hardware bridge slave IP cores are configured to capture stream data over the stream channels from the second partition circuitry and encode the stream data for conveyance to the data processing system.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, "data processing system" means one or more hardware systems configured to process data, each hardware system including at least one processor programmed to initiate operations and memory.

As defined herein, the term "processor" means at least one circuit capable of carrying out instructions contained in program code. The circuit may be an integrated circuit or embedded in an integrated circuit.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method, comprising:
    partitioning a circuit design into a top-level design and a sub-design along a boundary defined by one or more stream channels coupling a component of the top-level design with the sub-design;
    extracting the sub-design from the circuit design and replacing the sub-design with a stub, wherein the stub includes a client socket;
    adding a wrapper to the sub-design as extracted from the circuit design, wherein the wrapper includes a server socket;
    compiling the top-level design and the sub-design into a top-level simulation kernel and a sub-design simulation kernel, respectively; and
    simulating the circuit design by executing the top-level simulation kernel and the sub-design simulation kernel concurrently, wherein the top-level simulation kernel and the sub-design simulation kernel communicate over a socket connection established by the client socket and the server socket.

2. The method of claim 1, wherein the top-level simulation kernel and the sub-design simulation kernel execute in different processes of a data processing system.

3. The method of claim 1, wherein the client socket and the server socket are implemented in a high-level programming language.

4. The method of claim 1, wherein the stub includes a slave socket intellectual property core and a master socket intellectual property core that connect a circuit component of the top-level design with the client socket, wherein the slave socket intellectual property core and the master socket intellectual property core are specified in a hardware description language.

5. The method of claim 1, wherein the wrapper includes a slave socket intellectual property core and a master socket intellectual property core that connect the sub-design with the server socket, wherein the slave socket intellectual property core and the master socket intellectual property core are specified in a hardware description language.

6. The method of claim 1, comprising:
    compiling a further sub-design of the circuit design into partition circuitry for implementation in an integrated circuit, wherein the integrated circuit is coupled to a data processing system configured to execute at least one of the top-level simulation kernel or the sub-design simulation kernel;
    wherein the further sub-design is partitioned along a boundary defined by one or more stream channels; and
    performing hardware co-simulation of the circuit design by executing the at least one of the top-level simulation kernel or the sub-design simulation kernel using the data processing system in coordination with running the partition circuitry in the integrated circuit, wherein the at least one of the top-level simulation kernel or the sub-design simulation kernel communicates with the partition circuitry implemented in the integrated circuit over a communication link between the data processing system and the integrated circuit.

7. The method of claim 6, wherein at least one of the top-level design or the sub-design includes user-specified portions of the circuit design and the further sub-design includes one or more verified intellectual property cores.

8. A system, comprising:
    a processor programmed to initiate operations including:
        partitioning a circuit design into a top-level design and a sub-design along a boundary defined by one or more stream channels coupling a component of the top-level design with the sub-design;
        extracting the sub-design from the circuit design and replacing the sub-design with a stub, wherein the stub includes a client socket;
        adding a wrapper to the sub-design as extracted from the circuit design, wherein the wrapper includes a server socket;
        compiling the top-level design and the sub-design into a top-level simulation kernel and a sub-design simulation kernel, respectively; and
        simulating the circuit design by executing the top-level simulation kernel and the sub-design simulation kernel concurrently, wherein the top-level simulation kernel and the sub-design simulation kernel communicate over a socket connection established by the client socket and the server socket.

9. The system of claim 8, wherein the top-level simulation kernel and the sub-design simulation kernel execute in different processes of a data processing system.

10. The system of claim 8, wherein the client socket and the server socket are implemented in a high-level programming language.

11. The system of claim 8, wherein the stub includes a slave socket intellectual property core and a master socket intellectual property core that connect a circuit component of the top-level design with the client socket, wherein the slave socket intellectual property core and the master socket intellectual property core are specified in a hardware description language.

12. The system of claim 8, wherein the wrapper includes a slave socket intellectual property core and a master socket intellectual property core that connect the sub-design with the server socket, wherein the slave socket intellectual property core and the master socket intellectual property core are specified in a hardware description language.

13. The system of claim 8, wherein the processor is programmed to initiate operations including:
    compiling a further sub-design of the circuit design into partition circuitry for implementation in an integrated circuit, wherein the integrated circuit is coupled to a data processing system configured to execute at least one of the top-level simulation kernel or the sub-design simulation kernel;

wherein the further sub-design is partitioned along a boundary defined by one or more stream channels; and performing hardware co-simulation of the circuit design by executing the at least one of the top-level simulation kernel or the sub-design simulation kernel using the data processing system in coordination with running the partition circuitry in the integrated circuit, wherein the at least one of the top-level simulation kernel or the sub-design simulation kernel communicates with the partition circuitry implemented in the integrated circuit over a communication link between the data processing system and the integrated circuit.

14. The system of claim 13, wherein at least one of the top-level design or the sub-design includes user-specified portions of the circuit design and the further sub-design includes one or more verified intellectual property cores.

15. A method, comprising:
partitioning a circuit design into a plurality of partitions including a first partition and a second partition, wherein the plurality of partitions communicate through one or more stream channels;
compiling the first partition into a simulation kernel executable by a data processing system;
compiling the second partition into second partition circuitry for implementation in an integrated circuit coupled to the data processing system; and
performing hardware co-simulation of the circuit design by executing the simulation kernel using the data processing system in coordination with running the second partition circuitry in the integrated circuit, wherein the simulation kernel communicates with the second partition circuitry implemented in the integrated circuit over a communication link between the data processing system and the integrated circuit.

16. The method of claim 15, comprising:
connecting one or more software bridge slave intellectual property cores and one or more software bridge master intellectual property cores to the first partition; and
wherein the one or more software bridge slave intellectual property cores and the one or more software bridge master intellectual property cores are specified in a hardware description language.

17. The method of claim 16, comprising:
connecting each of the one or more software bridge slave intellectual property cores and the one or more software bridge master intellectual property cores to a hardware co-simulation manager; and
wherein the hardware co-simulation manager is specified in a high-level programming language.

18. The method of claim 15, comprising:
including a debug hub circuit block, a plurality of debug interface circuit blocks, one or more hardware bridge master intellectual property cores, and one or more hardware bridge slave intellectual property cores in the second partition; and
wherein the debug hub circuit block communicates over the communication link, each of the plurality of debug interface circuit blocks couples the debug hub circuit block to a respective one of the one or more hardware bridge master intellectual property cores or to a respective one of the one or more hardware bridge slave intellectual property cores.

19. The method of claim 18, wherein each of the one or more hardware bridge master intellectual property cores and each of the one or more hardware bridge slave intellectual property cores connects to the second partition circuitry.

20. The method of claim 18, wherein:
the one or more hardware bridge master intellectual property cores are configured to decode data received from the data processing system resulting in decoded data and generate stream data from the decoded data over hardware stream channels coupled to the second partition circuitry; and
the one or more hardware bridge slave intellectual property cores are configured to capture stream data over the hardware stream channels from the second partition circuitry and encode the stream data for conveyance to the data processing system.

* * * * *